(12) United States Patent
Bertrand (10) Patent No.: US 12,263,957 B2
(45) Date of Patent: Apr. 1, 2025

(54) ASSEMBLY FOR AIRCRAFT INCLUDING A CHASSIS AND A VISION MODULE OF AN ENHANCED FLIGHT VISION SYSTEM

(71) Applicant: Airbus Operations SAS, Toulouse (FR)

(72) Inventor: Sébastien Bertrand, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 12 days.

(21) Appl. No.: 18/352,447

(22) Filed: Jul. 14, 2023

(65) Prior Publication Data

US 2024/0017849 A1    Jan. 18, 2024

(30) Foreign Application Priority Data

Jul. 18, 2022   (FR) ...................................... 2207303

(51) Int. Cl.
*B64D 47/08*   (2006.01)
(52) U.S. Cl.
CPC .................................. *B64D 47/08* (2013.01)
(58) Field of Classification Search
CPC ...................................................... B64D 47/08
See application file for complete search history.

(56) References Cited

U.S. PATENT DOCUMENTS 9,185,290 B1 * 11/2015 Lapstun ................. H04N 23/58
2022/0204155 A1 * 6/2022 Messina ............... B64D 27/404

FOREIGN PATENT DOCUMENTS

EP        3984888 A1    4/2022
WO  WO-2019153821 A1 * 8/2019 ............. B64C 27/08

OTHER PUBLICATIONS

French Search Report for corresponding French Patent Application No. 2207303 dated Feb. 6, 2023; priority document.

* cited by examiner

*Primary Examiner* — Richard G Davis
(74) *Attorney, Agent, or Firm* — Greer, Burns & Crain, Ltd.

(57) ABSTRACT

An assembly for an aircraft including a vision module including a base and a chassis including a first beam fixed to the base by four fixing means, a second beam fixed to the first beam by four fixing means, and two third beams fixed to the structure of the aircraft and between which the second beam is fixed by two third fixing means, where each fixing means takes the form of a system with two eccentric rings where the two rings are mobile in rotation relative to one another about parallel rotation axes. Also an aircraft with such an assembly fixed to a structure thereof.

8 Claims, 3 Drawing Sheets

ASSEMBLY FOR AIRCRAFT INCLUDING A CHASSIS AND A VISION MODULE OF AN ENHANCED FLIGHT VISION SYSTEM

CROSS-REFERENCES TO RELATED APPLICATIONS

This application claims the benefit of French Patent Application Number 2207303 filed on Jul. 18, 2022, the entire disclosure of which is incorporated herein by way of reference.

FIELD OF THE INVENTION

The present invention concerns an assembly for an aircraft, said assembly including a vision module of an enhanced flight vision system and a chassis for fixing said vision module, as well as an aircraft including such an assembly.

BACKGROUND OF THE INVENTION

An aircraft classically includes an enhanced flight vision system. This system generally includes a vision module with a plurality of video cameras, a control unit and a display. The vision module is fixed to a structure of the aircraft at the front of the fuselage. The video cameras transmit the images that they capture to the control unit that causes them to be subjected to image processing in order to create a unique image and which then transmits that unique image to the display, which displays it. This system enables the pilot to see what is happening in front of the fuselage, more particularly in the event of bad weather. This system is usable not only during flight phases but also during take-off, landing and taxying phases.

This vision system is more particularly used during take-off and landing.

For the output image to be usable by the pilot the vision module must be fixed in a very precise manner and remain in the same position throughout the service life of the aircraft.

It is therefore necessary to find an arrangement that guarantees the correct positioning of the vision module and therefore of the video cameras over time.

SUMMARY OF THE INVENTION

An object of the present invention is to provide an assembly for an aircraft, said assembly including a vision module of an enhanced flight vision system with at least one video camera and a chassis for fixing said vision module to the structure of the aircraft, which chassis enables adjustment in each direction.

To this end there is proposed an assembly for an aircraft, said assembly including:
a vision module of an enhanced flight vision system including a base, and
a chassis including:
a first beam to which the base is fixed by four first fixing means,
a second beam to which the first beam is fixed by four second fixing means, and
two third beams intended to be fixed to a structure of the aircraft and between which the second beam is fixed by two third fixing means with each third beam,
where each fixing means takes the form of a system with two eccentric rings where the two rings are mobile in rotation relative to one another about parallel rotation axes.

There is also proposed an assembly for an aircraft, said assembly including:
a vision module of an enhanced flight vision system including a base, and
a chassis including:
two first beams where the base is fixed to each first beam by two first fixing means,
a second beam to which each first beam is fixed by two second fixing means, and
two third beams intended to be fixed to a structure of the aircraft and between which the second beam is fixed by two third fixing means with each third beam,
where each fixing means takes the form of a system with two eccentric rings where the two rings are mobile in rotation relative to one another about parallel rotation axes.

With such an arrangement the fixing means with two eccentric rings enable adjustment of the chassis, transfer of loads in all directions, and above all locking of the positions because the friction of each ring prevents going out of adjustment.

The rotation axes of the first fixing means are advantageously oriented in a first direction, the rotation axes of the second fixing means are advantageously oriented in a second direction, the rotation axes of the third fixing means are advantageously oriented in a third direction, and the first direction, the second direction and the third direction are advantageously all different.

Pairs of the first direction, the second direction and the third direction are advantageously mutually orthogonal.

Each fixing system advantageously includes a bolt, a nut, an outer ring and an inner ring, for each first fixing means one of the first beam or the base includes a first bore the first axis of which is parallel to the rotation axes of said first fixing system, the other of the base or the first beam includes a second bore the axis of which is parallel to the first axis, the outer ring has an outer shoulder bearing against the other of the base or the first beam on the side opposite one of the first beam or the base and an outer bush the outside diameter of which is equal to the diameter of the second bore, where the outer shoulder and the outer bush are pierced by a third bore the axis of which is offset relative to the axis of the outer bush and parallel to the first axis, the inner ring includes an inner shoulder bearing against the outer shoulder on the side opposite the other of the base or the first beam and an inner bush the outside diameter of which is equal to the diameter of the third bore, where the inner shoulder and the inner bush are pierced by a fourth bore the axis of which is offset relative to axis of the inner bush and parallel to the first axis and the diameter of which is equal to the diameter of the first bore, and the shank of the bolt is inserted in the fourth bore and the first bore, the head of the bolt is against the inner shoulder and the nut is against one of the first beam or the base opposite the other of the base or the first beam, for each second fixing means one of the first beam or the second beam includes a first bore the first axis of which is parallel to the rotation axes of said second fixing system, the other of the second beam or the first beam includes a second bore the axis of which is parallel to the first axis, the outer ring includes an outer shoulder bearing against the other of the second beam or the first beam on the side opposite one of the first beam or the second beam and an outer bush the outside diameter of which is equal to the diameter of the second bore, where the outer shoulder and the outer bush are pierced by a third bore the axis of which is offset relative to the axis of the outer bush and parallel to the first axis, the inner ring includes an inner shoulder bearing against the outer shoulder on the side opposite the other of the second beam or the first beam and an inner bush the outside diameter of which is equal to the diameter of the third bore, where the inner shoulder and the inner bush are pierced by a fourth bore the axis of which is offset relative to the axis of the inner bush and parallel to the first axis and the diameter of which is equal to the diameter of the first bore, and the shank of the bolt is inserted in the fourth bore and the first bore, the head of the bolt is against the inner shoulder and the nut is against one of the first beam or the second beam opposite the other of the second beam or the first beam, and for each third fixing means one of one of the third beams or the second beam includes a first bore the first axis of which is parallel to the rotation axes of said third fixing system, the other of the second beam or one of the third beams includes a second bore the axis of which is parallel to the first axis, the outer ring includes an outer shoulder bearing against the other of the second beam or one of the third beams on the side opposite one of one of the third beams or the second beam and an outer bush the outside diameter of which is equal to the diameter of the second bore, where the outer shoulder and the outer bush are pierced by a third bore the axis of which is offset relative to the axis of the outer bush and parallel to the first axis, the inner ring includes an inner shoulder bearing against the outer shoulder on the side opposite the other of the second beam or one of the third beams and an inner bush the outside diameter of which is equal to the diameter of the third bore, where the inner shoulder and the inner bush are pierced by a fourth bore the axis of which is offset relative to the axis of the inner bush and parallel to the first axis and the diameter of which is equal to the diameter of the first bore and the shank of the bolt is inserted in the fourth bore and the first bore, the head of the bolt is against the inner shoulder and the nut is against one of one of the third beams or the second beam opposite the other of the second beam and one of the third beams.

The invention also proposes an aircraft including a structure and an assembly according to either one of the preceding two embodiments where each third beam is fixed to said structure.

The rotation axes of the first fixing means are advantageously oriented in a first direction, the rotation axes of the second fixing means are advantageously oriented in a second direction, the rotation axes of the third fixing means are advantageously oriented in a third direction, the first direction is advantageously parallel to a vertical direction of the aircraft, the second direction is advantageously parallel to a longitudinal direction of the aircraft and the third direction is advantageously parallel to a transverse direction of the aircraft.

Each third beam is advantageously fixed to the structure by two fourth fixing systems where each fourth fixing means takes the form of a system with two eccentric rings where the two rings are mobile in rotation relative to one another about parallel rotation axes.

Each fourth fixing system advantageously includes a bolt, a nut, an outer ring and an inner ring and for each fourth fixing means one of the third beam or the structure includes a first bore the first axis of which is parallel to the rotation axes of said fourth fixing means, the other of the structure or the third beam includes a second bore the axis of which is parallel to the first axis, the outer ring includes an outer shoulder bearing against the other of the structure or the third beam on the side opposite one of the third beam or the structure and an outer bush the outside diameter of which is equal to the diameter of the second bore, where the outer shoulder and the outer bush are pierced by a third bore the axis of which is offset relative to the axis of the outer bush and parallel to the first axis, the inner ring includes an inner shoulder bearing against the outer shoulder on the side opposite the other of the structure or the third beam and an inner bush the outside diameter of which is equal to the diameter of the third bore, where the inner shoulder and the inner bush are pierced by a fourth bore the axis of which is offset relative to the axis of the inner bush and parallel to the first axis and the diameter of which is equal to the diameter of the first bore and the shank of the bolt is inserted in the fourth bore and the first bore, the head of the bolt is against the inner shoulder and the nut is against one of the third beam or the structure opposite the other of the structure or the third beam.

The rotation axes of each fourth fixing means are advantageously oriented in a direction parallel to a longitudinal direction of the aircraft.

BRIEF DESCRIPTION OF THE DRAWINGS

The features of the invention mentioned hereinabove and others will become more clearly apparent on reading the following description of one embodiment of the invention, said description being given with reference to the appended drawings, in which.

DETAILED DESCRIPTION OF THE PREFERRED EMBODIMENTS

Figure 1:
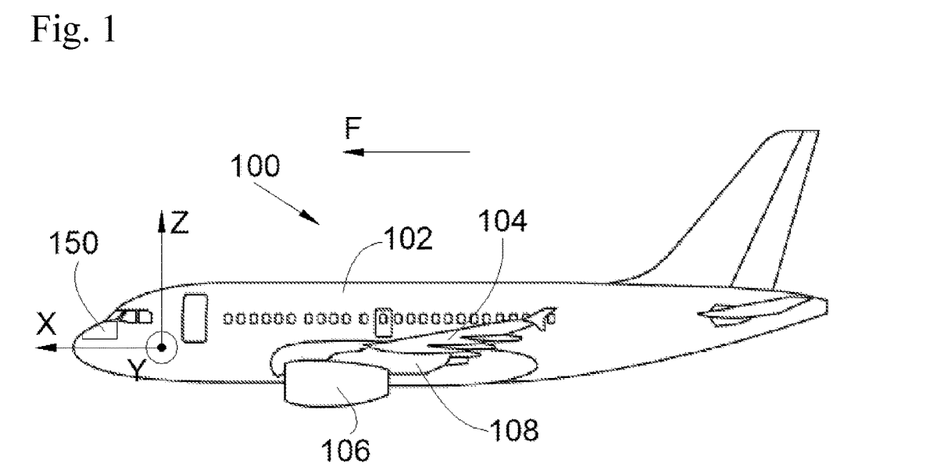
FIG. 1 is a side view of an aircraft including an assembly according to the invention.

FIG. 1 shows an aircraft 100 that includes a fuselage 102 to each side of which is fixed a wing 104 that carries at least one jet engine 106. The engine 106 is fixed under the wing 104 by means of a pylon 108.

In the following description, and by convention, X denotes the longitudinal direction of the aircraft 100 oriented positively toward the front of the aircraft 100, Y denotes the transverse direction that is horizontal when the aircraft is on the ground, and Z denotes the vertical direction, these three directions X, Y and Z being mutually orthogonal.

Also, the terms "front" and "rear" are to be considered with reference to a direction of forward movement of the aircraft 100 when the jet engine 106 is operating, this direction being represented schematically by the arrow F in FIG. 1.

Figure 2:
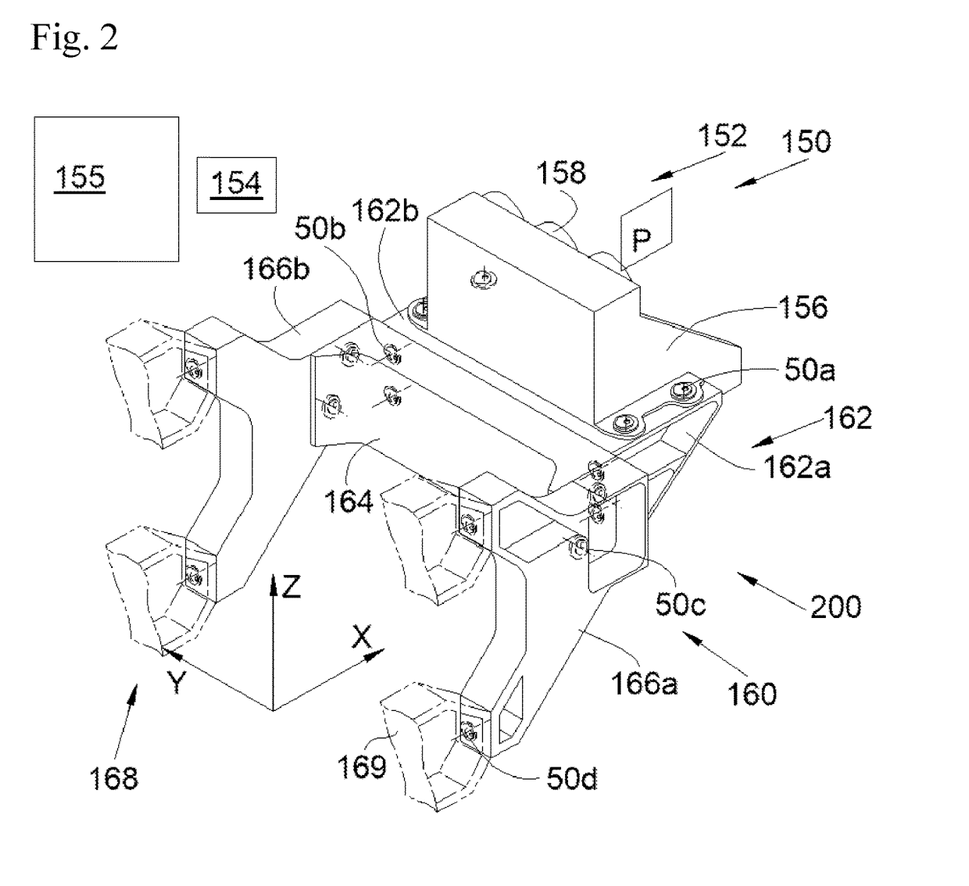
FIG. 2 is a perspective view of an enhanced flight vision system included in an assembly in accordance with a first embodiment of the invention.

The aircraft 100 includes an enhanced flight vision system 150 that is represented in FIG. 2. The enhanced flight vision system 150 is represented in FIG. 1 in an upper part of the nose of the aircraft 100, but another position is possible, for example in the lower part of the nose.

The enhanced flight vision system 150 includes a vision module 152 including a base 156 to which at least one video camera 158 is fixed and that is oriented toward the front of the aircraft 100, a control unit 154 and a display 155, such as a screen or monitor, that is arranged on the flight deck in such a manner as to be seen by the pilot. The control unit 154 and the display 155 are not described in more detail because they do not form part of the invention as such and they may take the same form as in the prior art. As in the prior art the images captured by the video cameras are processed by the control unit 154 and a single image is sent to display 155.

In a similar manner the number of video cameras 158 and the type of camera 158 of the vision module 152 are not described in more detail because they do not form part of the invention as such and they may take the same form as in the prior art.

FIG. 2 also shows a chassis 160 that carries the vision module 152 and forms with it an assembly 200 according to the invention. FIG. 2 shows the assembly 200 in accordance with a first embodiment.

The chassis 160 includes a first beam 162 to which the base 156 is fixed by four first fixing means 50a.

The chassis 160 includes a second beam 164 to which the first beam 162 is fixed by four second fixing means 50b.

The chassis 160 includes two third beams 166a-b that are fixed to a structure 168 of the aircraft 100 (depicted in dashed line) and between which the second beam 164 is fixed by four third fixing means 50c, namely two third fixing means 50c between the second beam 164 and each third beam 166a-b.

The first fixing means 50a, the second fixing means 50b and the third fixing means 50c are identical.

Each third beam 166a-b is fixed to the structure 168 which here includes four shoes 169 (here represented in dashed line in FIGS. 2 and 4) and each third beam 166a-b is fixed to two of these shoes 169 by a fourth fixing system 50d. Each third beam 166a-b is therefore fixed to the structure 168 by two fourth fixing systems 50d.

Figure 4:
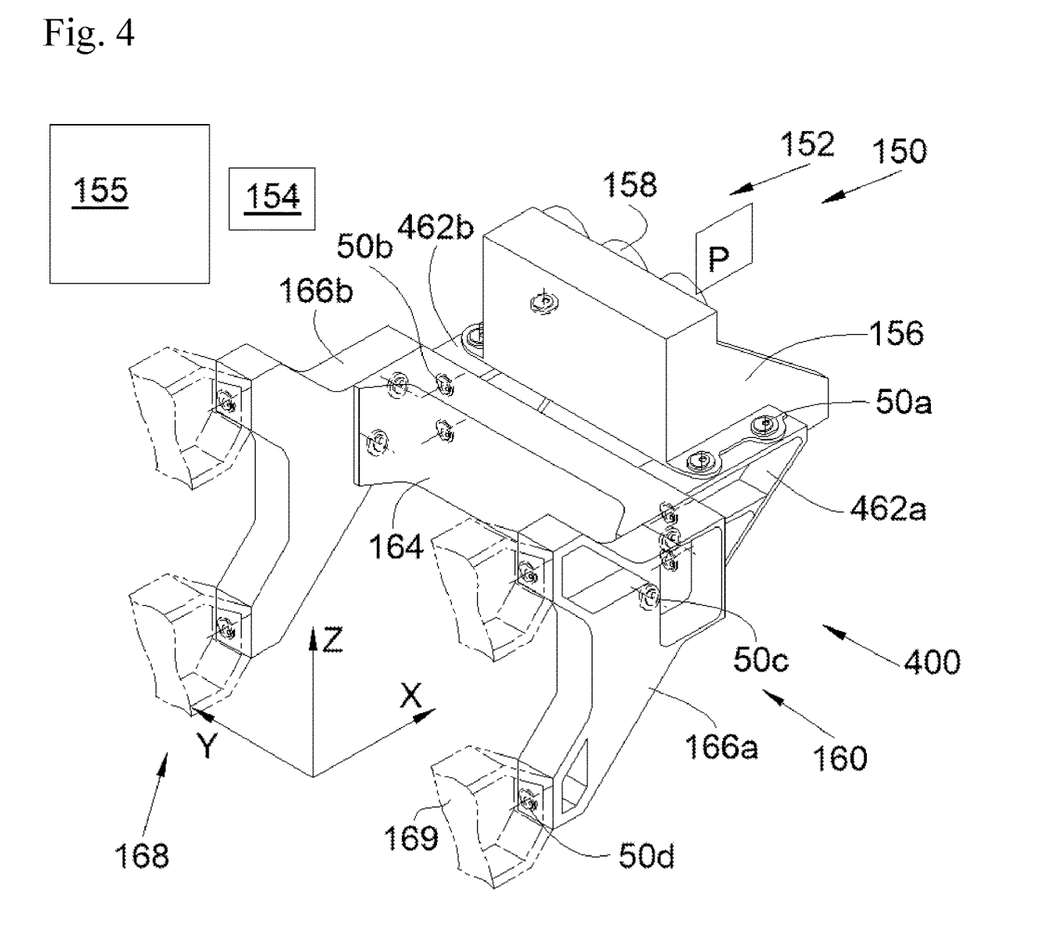
FIG. 4 is a perspective view of an enhanced flight vision system included in an assembly in accordance with a second embodiment of the invention.

The fourth fixing systems 50d are identical to the first, second and third fixing means 50a-c.

Figure 3:
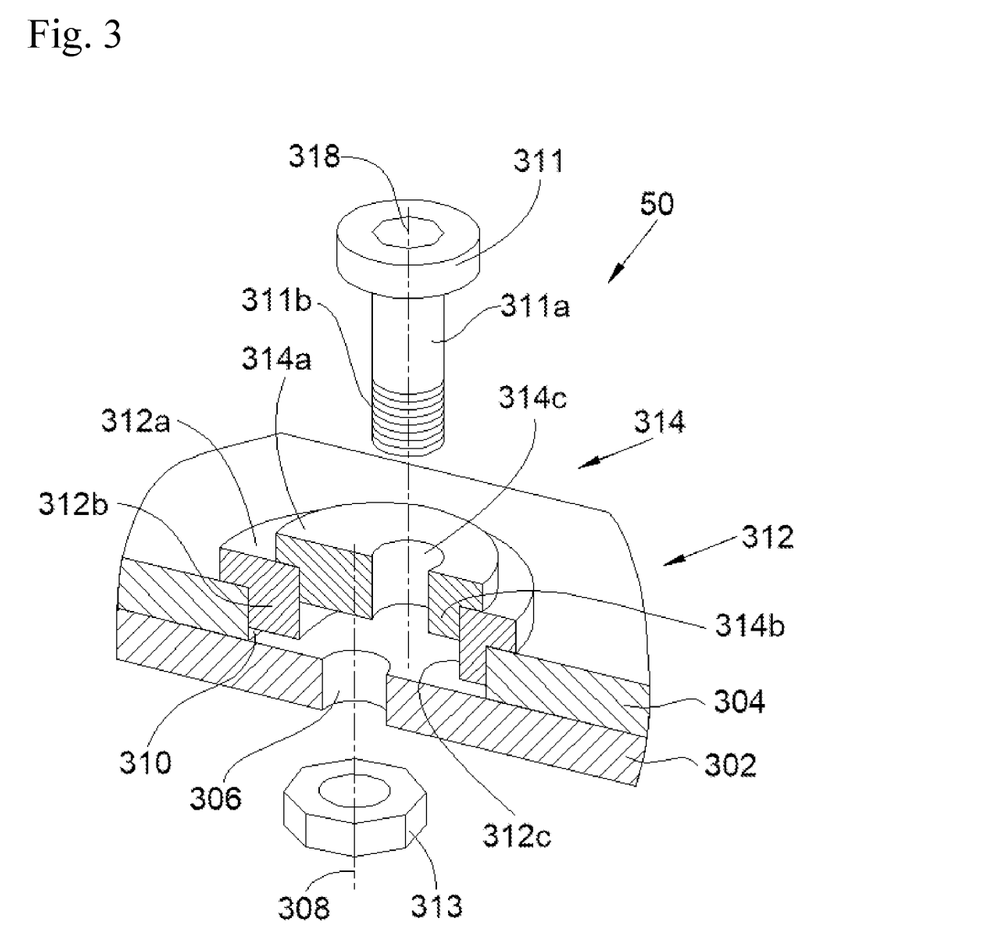
FIG. 3 is a view in section of a fixing means with two eccentric rings.

FIG. 3 shows a section of a fixing system 50 between a first plate 302 and a second plate 304 that may be the beams 162, 164, 166a-b, the base 156 or the structure 168. The two plates 302 and 304 are parallel to each other and bear one against the other.

The first plate 302 includes a first bore 306 with a first axis 308.

The second plate 304 includes a second bore 310 the axis of which is parallel to the first axis 308 and the diameter of which is greater than the diameter of the first bore 306.

The fixing system 50 is a system with two eccentric rings 312 and 314 in which the two rings 312 and 314 are mobile in rotation relative to one another about two rotation axes parallel to one another and parallel to the first axis 308.

Here the fixing system 50 includes a nut and bolt comprising a bolt 311 and a nut 313, an outer ring 312 and an inner ring 314.

The outer ring 312 has an outer shoulder 312a that bears against the second plate 304 on the side opposite the first plate 302 and an outer bush 312b the outside diameter of which is equal to the diameter of the second bore 310. The outer shoulder 312a and the outer bush 312b are pierced by a third bore 312c the axis of which is offset relative to the axis of the outer bush 312b and parallel to the first axis 308 and the diameter of which is greater than the diameter of the first bore 306.

The inner ring 314 includes an inner shoulder 314a that bears against the outer shoulder 312a on the side opposite the second plate 304 and an inner bush 314b the outside diameter of which is equal to the diameter of the third bore 312c. The inner shoulder 314a and the inner bush 314b are pierced by a fourth bore 314c the axis of which, termed the second axis 318, is offset relative to the axis of the inner bush 314b and parallel to the first axis 308 and the diameter of which is equal to the diameter of the first bore 306.

By turning the outer ring 312 and the inner ring 314 about their rotation axes it is therefore possible to align the first axis 308 and the second axis 318. It is then possible to insert the shank of the bolt 311 in the fourth bore 314c and the first bore 306, bringing the head against the inner shoulder 314a, and tightening the nut 313 against the first plate 302 opposite the second plate 304.

The shank of the screw 311 includes a smooth zone 311a at the head end and an externally threaded zone 311b opposite its head. The bolt 311 is preferably sized so that the smooth zone 311a extends along the first bore 306 and the fourth bore 314c and the externally threaded zone 311b is preferably beyond the first bore 306. The zone of the bolt 311 that is in the first bore 306 and the fourth bore 314c, here the smooth zone 311a, is threaded into and a diameter fit inside the first bore 306 and the fourth bore 314c.

The two rings 312 and 314 are accommodated in and a diameter fit in the corresponding bores, namely the second bore 310 and the third bore 312c.

Note that the concept of a diameter fit consists in having a junction having an axis and a bore with the same nominal diameter and with a clearance reduced to its minimum to enable assembly thereof. A diameter fit of this kind is for example of the H7g6 type.

With a fixing system 50 of this kind the two plates 302 and 304 are perfectly fixed to one another with no excessive clearance.

Using four fixing means 50a-c for fixing together two beams or the base 156 and a beam prevents any loss of adjustment occurring because it is highly improbable that the four fixing means will lose adjustment simultaneously because of the friction between the rings 312 and 314. Indeed, movement in translation of the plate 302 relative to the plate 304 would presuppose a perfect combination of rotation of the eccentric rings 312 and 314. This combination being highly improbable, the assembly 200 has an irreversible characteristic once the various beams have been fitted.

In the first embodiment of the invention shown in FIG. 2 the base 156 is fixed to the first beam 162 by the four fixing means 50a the rotation axes of which are parallel to the vertical direction Z. The four first fixing means 50a are disposed in pairs on either side of a median plane P of the assembly 200 that is parallel to the vertical plane XZ. The first beam 162 then constitutes the first plate 302 and the base 156 then constitutes the second plate 304, but the reverse arrangement is possible.

In the first embodiment of the invention shown in FIG. 2 the first beam 162 is fixed to the second beam 164 by the four second fixing means 50b the rotation axes of which are parallel to the longitudinal direction X. The four second fixing means 50b are disposed in pairs on either side of the median plane P of the assembly 200. The second beam 164 then constitutes the first plate 302 and the first beam 162 then constitutes the second plate 304, but the reverse arrangement is possible.

In the first embodiment of the invention shown in FIG. 2 the second beam 164 is fixed to each third beam 166a-b by the two third fixing means 50c the rotation axes of which are parallel to the transverse direction Y. The third beams 166a-b are disposed on either side of the median plane P of the assembly 200. The second beam 164 then constitutes the first plate 302 and each third beam 166a-b then constitutes a second plate 304, but the reverse arrangement is possible.

Generally speaking, to provide adjustment in three directions the rotation axes of the first fixing means 50a between the base 156 and the first beam 162 are therefore oriented in a first direction, the rotation axes of the second fixing means 50b between the first beam 162 and the second beam 164 are therefore oriented in a second direction, and the rotation axes of the third fixing means 50c between the second beam 164 and the third beams 166a-b are therefore oriented in a third direction, where the first direction, the second direction and the third direction are all different and pairs of which are preferably orthogonal to one another two by two.

In the first embodiment of the invention described here the first direction is parallel to the vertical direction Z of the aircraft 100, the second direction is parallel to the longitudinal direction X of the aircraft 100 and the third direction is parallel to the transverse direction Y of the aircraft 100.

Generally speaking, for each first fixing means 50a one of the first beam 162 or the base 156 includes a first bore 306 the first axis 308 of which is parallel to the rotation axes of said first fixing system 50a and the other of the base 156 or the first beam 162 includes a second bore 310 the axis of which is parallel to the first axis 308, the outer ring 312 having an outer shoulder 312a bearing against one of the base 156 or the first beam 162 on the side opposite one of the first beam 162 or the base 156 and an outer bush 312b the outside diameter of which is equal to the diameter of the second bore 310, where the outer shoulder 312a and the outer bush 312b are pierced by a third bore 312c the axis of which is also relative to the axis of the outer bush 312b and parallel to the first axis 308, the inner ring 314 includes an inner shoulder 314a bearing against the outer shoulder 312a on the side opposite the other of the base 156 or the first beam 162 and an inner bush 314b the outside diameter of which is equal to the diameter of the third bore 312c, where the inner shoulder 314a and the inner bush 314b are pierced by a fourth bore 314c the axis 318 of which is offset relative to the axis of the inner bush 314b and parallel to the first axis 308 and the diameter of which is equal to the diameter of the first bore 306, and the shank of the bolt 311 is inserted in the fourth bore 314c and the first bore 306, the head of the bolt 311 is against the inner shoulder 314a and the nut 313 is against one of the first beam 162 or the base 156 opposite the other of the base 156 or the first beam 162.

In the same manner, for each second fixing means 50b, one of the first beam 162 or the second beam 164 includes a first bore 306 the first axis 308 of which is parallel to the rotation axes of said second fixing system 50b, the other of the second beam 164 or the first beam 162 includes a second bore 310 the axis of which is parallel to the first axis 308, the outer ring 312 includes an outer shoulder 312a bearing against the other of the second beam 164 or the first beam 162 on the side opposite one of the first beam 162 or the second beam 164, and an outer bush 312b the outside diameter of which is equal to the diameter of the second bore 310, where the outer shoulder 312a and the outer bush 312b are pierced by a third bore 312c the axis of which is offset relative to the axis of the outer bush 312b and parallel to the first axis 308, the inner ring 314 includes an inner shoulder 314a bearing against the outer shoulder 312a on the side opposite the other of the second beam 164 or the first beam 162, and an inner bush 314b the outside diameter of which is equal to the diameter of the third bore 312c, where the inner shoulder 314a and the inner bush 314b are pierced by a fourth bore 314c the axis 318 of which is offset relative to axis of the inner bush 314b and parallel to the first axis 308 and the diameter of which is equal to the diameter of the first bore 306, and the shank of the bolt 311 is inserted in the fourth bore 314c and the first bore 306, the head of the bolt 311 is against the inner shoulder 314a and the nut 313 is against one of the first beam 162 or the second beam 164 opposite the other of the second beam 164 or the first beam 162.

In the same manner, for each third fixing means 50c one of one of the third beams 166a-b or the second beam 164 includes a first bore 306 the first axis 308 of which is parallel to the rotation axes of said third fixing system 50c, the other of the second beam 164 or the one of the third beams 166a-b includes a second bore 310 the axis of which is parallel to the first axis 308, the outer ring 312 includes an outer shoulder 312a bearing against the other of the second beam 164 or one of the third beams 166a-b on the side opposite one of one of the third beams 166a-b or the second beam 164 and an outer bush 312b the outer diameter of which is equal to the diameter of the second bore 310, where the outer shoulder 312a and the outer bush 312b are pierced by a third bore 312c the axis of which is offset relative to the axis of the outer bush 312b and parallel to the first axis 308, the inner ring 314 includes an inner shoulder 314a bearing against the outer shoulder 312a on the side opposite the other of the second beam 164 or one of the third beams 166a-b and an inner bush 314b the outside diameter of which is equal to the diameter of the third bore 312c, where the inner shoulder 314a and the inner bush 314b are pierced by a fourth bore 314c the axis 318 of which is offset relative to the axis of the inner bush 314b and parallel to the first axis 308 and the diameter of which is equal to the diameter of the first bore 306, and the shank of the bolt 311 is inserted in the fourth bore 314c and the first bore 306, the head of the bolt 311 is against the inner shoulder 314a and the nut 313 is against one of one of the third beams 166a-b or the second beam 164 opposite the other of the second beam 164 and one of the third beams 166a-b.

In the first embodiment of the invention shown in FIG. 2 the rotation axis of each fourth fixing system 50d is oriented in a direction parallel to the longitudinal direction X.

As before, each fourth fixing system 50d includes a bolt 311, a nut 313, an outer ring 312 and an inner ring 314. For each fourth fixing means 50d one of the third beam 166a-b or the structure 168 includes a first bore 306 the first axis 308 of which is parallel to the rotation axes of said fourth fixing means 50d, the other of the structure 168 or the third beam 166a-b includes a second bore 310 the axis of which is parallel to the first axis 308, the outer ring 312 includes an outer shoulder 312a bearing against the other of the structure 168 or the third beam 166a-b on the side opposite one of the third beam 166a-b or the structure 168 and an outer bush 312b the outside diameter of which is equal to the diameter of the second bore 310, where the outer shoulder 312a and the outer bush 312b are pierced by a third bore 312c the axis of which is offset relative the axis of the outer bush 312b and parallel to the first axis 308, the inner ring 314 includes an inner shoulder 314a bearing against the outer shoulder 312a on the side opposite the other of the structure 168 or the third beam 166a-b and an inner bush 314b the outside diameter of which is equal to the diameter of the third bore 312c, where the inner shoulder 314a and the inner bush 314b are pierced by a fourth bore 314c the axis 318 of which is offset relative to the axis of the inner bush 314b and parallel to the first axis 308 and the diameter of which is equal to the diameter of the first bore 306, and the shank of the bolt 311 is inserted in the fourth bore 314c and the first bore 306, the head of the bolt 311 is against the inner shoulder 314a and the nut 313 is against one of the third beam 166a-b or the structure 168 opposite the other of the structure 168 or the third beam 166a-b.

In the first embodiment of the invention shown in FIG. 2 the first beam 162 takes the form of a fork with two teeth 162a-b where the base 156 is accommodated between the teeth 162a-b and where each first fixing means 50a is mounted between the base 156 and one of the teeth 162a-b. Each tooth 162a-b extends parallel to the longitudinal direction X and therefore perpendicularly to the rotation axes of the first fixing means 50a.

In the first embodiment of the invention the first beam 162 consists of a single component but in a variant the first beam 162 may consist of a plurality of components fixed to one another by fixing elements such as nuts and bolts, rivets, etc.

FIG. 4 shows an assembly 400 in accordance with a second embodiment. The elements described for the first embodiment apply in the same manner to the second embodiment and in the second embodiment the difference lies in the fact that the first beam 162 is replaced by two first beams 462a-b here each constituting one of the teeth of the fork described hereinabove.

The assembly 400 includes the vision module 152 with its base 156 and a chassis 160 that includes the two first beams 462a-b and where the base 156 is fixed to each first beam 462a-b by two fixing means 50a.

In the second embodiment each first beam 462a-b is fixed to the second beam 164 by two second fixing means 50b.

As in the first embodiment there are two third beams 166a-b fixed to the structure 168 and the second beam 164 is fixed by two third fixing means 50c with each third beam 166a-b.

As in the first embodiment each fixing means 50a-c takes the form of a system with two eccentric rings 312, 314 where the two rings 312, 314 are mobile in rotation relative to one another about parallel rotation axes.

As in the first embodiment the use of a plurality of fixing means 50a-c for fixing two beams together prevents loss of adjustment occurring because it is highly unlikely that the fixing means lose adjustment simultaneously because of the friction between the rings 312 and 314. In the second embodiment there are two fixing means for fixing the base 156 to each first beam 462a-b and each first beam 462a-b to the second beam 164 rather than four, but the assembly losing alignment would presuppose a perfect combination of rotation of the eccentric rings 312 and 314 that is also highly improbable.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. An assembly for an aircraft, said assembly comprising:
   a vision module of an enhanced flight vision system including a base, and
   a chassis including:

a first beam to which the base is fixed by four first fixing means, a second beam to which the first beam is fixed by four second fixing means, and two third beams configured to be fixed to a structure of the aircraft and between which the second beam is fixed by two third fixing means with each third beam, where each fixing means comprises a fixing system with two eccentric rings wherein the two eccentric rings are mobile in rotation relative to one another about parallel rotation axes.

2. The assembly according to claim 1, wherein the rotation axes of the first fixing means are oriented in a first direction, wherein the rotation axes of the second fixing means are oriented in a second direction, wherein the rotation axes of the third fixing means are oriented in a third direction, and wherein the first direction, the second direction and the third direction are all different.

3. The assembly according to claim 1, wherein each fixing system further comprises a bolt, a nut, an outer ring and an inner ring, wherein for each first fixing means one of the first beam or the base includes a first bore, a first axis of which is parallel to the rotation axes of said first fixing system, the other of the base or the first beam includes a second bore an axis of which is parallel to the first axis, the outer ring has an outer shoulder bearing against the other of the base or the first beam on a side opposite one of the first beam or the base and an outer bush, an outside diameter of which is equal to a diameter of the second bore, where the outer shoulder and the outer bush are pierced by a third bore, an axis of which is offset relative to an axis of the outer bush and parallel to the first axis, the inner ring includes an inner shoulder bearing against the outer shoulder on a side opposite the other of the base or the first beam and an inner bush, an outside diameter of which is equal to a diameter of the third bore, where the inner shoulder and the inner bush are pierced by a fourth bore, an axis of which is offset relative to an axis of the inner bush and parallel to the first axis and a diameter of which is equal to the diameter of the first bore, and a shank of the bolt is inserted in the fourth bore and the first bore, a head of the bolt is against the inner shoulder and the nut is against one of the first beam or the base opposite the other of the base or the first beam, wherein for each second fixing means one of the first beam or the second beam includes a first bore, a first axis of which is parallel to the rotation axes of said second fixing system, the other of the second beam or the first beam includes a second bore, an axis of which is parallel to the first axis, the outer ring includes an outer shoulder bearing against the other of the second beam or the first beam on a side opposite one of the first beam or the second beam and an outer bush, an outside diameter of which is equal to a diameter of the second bore, where the outer shoulder and the outer bush are pierced by a third bore, an axis of which is offset relative to the axis of the outer bush and parallel to the first axis, the inner ring includes an inner shoulder bearing against the outer shoulder on a side opposite the other of the second beam or the first beam and an inner bush, an outside diameter of which is equal to a diameter of the third bore, where the inner shoulder and the inner bush are pierced by a fourth bore having an axis offset relative to the axis of the inner bush parallel to the first axis and a diameter of which is equal to the diameter of the first bore and the shank of the bolt is inserted in the fourth bore and the first bore, the head of the bolt is against the inner shoulder and the nut is against one of the first beam or the second beam opposite the other of the second beam or the first beam, and wherein for each third fixing means one of one of the third beams or the second beam includes a first bore, a first axis of which is parallel to the rotation axes of said third fixing means, the other of the second beam or one of the third beams includes a second bore, an axis of which is parallel to the first axis, the outer ring includes an outer shoulder bearing against the other of the second beam or one of the third beams on a side opposite one of one of the third beams or the second beam and an outer bush, an outside diameter of which is equal to a diameter of the second bore, where the outer shoulder and the outer bush are pierced by a third bore, an axis of which is offset relative to an axis of the outer bush and parallel to the first axis, the inner ring includes an inner shoulder bearing against the outer shoulder on a side opposite the other of the second beam or one of the third beams and an inner bush the outside diameter of which is equal to a diameter of the third bore, where the inner shoulder and the inner bush are pierced by a fourth bore, an axis of which is offset relative to the axis of the inner bush and parallel to the first axis and a diameter of which is equal to the diameter of the first bore and the shank of the bolt is inserted in the fourth bore and the first bore, the head of the bolt is against the inner shoulder and the nut is against one of one of the third beams or the second beam opposite the other of the second beam and one of the third beams.

4. An aircraft including:

a structure and the assembly according to claim 1, wherein each third beam is fixed to said structure.

5. The aircraft according to claim 4, wherein the rotation axes of the first fixing means are oriented in a first direction, wherein the rotation axes of the second fixing means are oriented in a second direction, wherein the rotation axes of the third fixing means are oriented in a third direction, wherein the first direction is parallel to a vertical direction of the aircraft, wherein the second direction is parallel to a longitudinal direction of the aircraft and wherein the third direction is parallel to a transverse direction of the aircraft.

6. The aircraft according to claim 4, wherein each third beam is fixed to the structure by two fourth fixing means where each fourth fixing means comprises a fixing system with two eccentric rings where the two eccentric rings are mobile in rotation relative to one another about parallel rotation axes.

7. The aircraft according to claim 6, wherein each fourth fixing system includes a bolt, a nut, an outer ring and an inner ring, and wherein for each fourth fixing means one of the third beam or the structure includes a first bore, a first axis of which is parallel to the rotation axes of said fourth fixing means, the other of the structure or the third beam includes a second bore, an axis of which is parallel to the first axis, the outer ring includes an outer shoulder bearing against the other of the structure or the third beam on a side opposite one of the third beam or the structure and an outer bush, an outside diameter of which is equal to a diameter of the second bore, where the outer shoulder and the outer bush are pierced by a third bore, an axis of which is offset relative to an axis of the outer bush and parallel to the first axis, the inner ring includes an inner shoulder bearing against the outer shoulder on a side opposite the other of the structure or the third beam and an inner bush, an outside diameter of which is equal to a diameter of the third bore, where the inner shoulder and the inner bush are pierced by a fourth bore, an axis of which is offset relative to an axis of the inner bush and parallel to the first axis and a diameter of which is equal to a diameter of the first bore and a shank of the bolt is inserted in the fourth bore and the first bore, a head of the bolt is against the inner shoulder and the nut is against one of the third beam or the structure opposite the other of the structure or the third beam.

8. The aircraft according to claim 7, wherein the rotation axes of each fourth fixing means are oriented in a direction parallel to a longitudinal direction of the aircraft.

\* \* \* \* \*